STEREO PHONOGRAPH PICKUP AND TURNOVER MECHANISM

Original Filed May 21, 1958 2 Sheets-Sheet 1

Inventors:
Howard M. Durbin
John F. Wood
By: Frost, Burmeister & Kulie
Attorneys Jan. 13, 1970 H. M. DURBIN ET AL 3,489,864

STEREO PHONOGRAPH PICKUP AND TURNOVER MECHANISM

Original Filed May 21, 1958 2 Sheets-Sheet 2

Inventors:
Howard M. Durbin
John F. Wood
By: Frost, Burmeister & Kulie
Attorneys

United States Patent Office 3,489,864
Patented Jan. 13, 1970

3,489,864

STEREO PHONOGRAPH PICKUP AND TURNOVER MECHANISM

Howard M. Durbin, South Bend, Ind., and John F. Wood, Gueynaba, Puerto Rico, assignors, by mesne assignments, to Electro-Voice Incorporated, Buchanan, Mich., a corporation of Delaware Continuation of application Ser. No. 736,819, May 21, 1958. This application Mar. 8, 1965, Ser. No. 438,002
Int. Cl. H04r *1/16, 11/08*
U.S. Cl. 179—100.41 6 Claims This invention relates generally to phonograph pickups for reproducing stereophonic record discs, and more particularly to a phonograph pickup suitable for reproducing stereophonic record discs as well as "Standard" groove record discs. This application is a continuation of application Ser. No. 736,819, now abandoned, of the present inventors, filed May 21, 1958.

Recently, records have been introduced with two sound channels recorded in a single groove or track in order to produce stereophonic sound reproduction. In the process of recording stereophonic sound on discs, two separate sound channels are employed. Each sound channel is provided with a separate microphone, and the microphones of the two channels are spacer from each other. A single cutting mechanism is simultaneously translated in response to the two sound channels so that a single groove carries the modulations of the two sound channels. Two systems are currently being employed to impress the two sound channels on a single groove. The one system simultaneously modulates the cutting head with the two channels by impressing one of the channels on the cutting head along the vertical axis to the record disc and the other along the horizontal axis. The other system modulates the cutting head along two orthogonally related axes which are disposed at 45 degrees to the plane of the record. The present invention may be employed with records recorded in either manner, however, the specific embodiment illustrated is designed for use with records recorded in the latter manner.

It is one of the objects of the present invention to provide a phonograph pickup with a single stylus which is responsive to stereophonic records and also to monaural records of the conventional type.

Further, it is an object of the present invention to provide a phonograph pickup for reproducing stereophonic microgroove records and monaural records employing "standard" grooves.

Further, it is an object of the present invention to provide a combination phonograph pickup and turnover mechanism for reproducing stereophonic and microgroove records with one stylus and wider grooved monaural records with a second stylus.

These and further objects of the present invention will be apparent from a further reading of this disclosure, particularly when viewed in the light of the drawings, in which.

Figure 1:
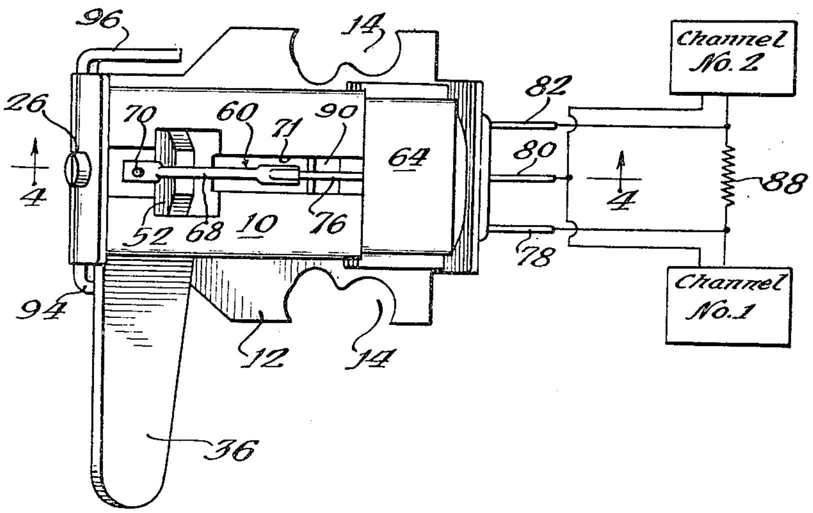
FIGURE 1 is a plan view of a stereophonic phonograph pickup constructed according to the teachings of the present invention and a diagrammatic view of the other elements of a stereophonic reproducing device.
Figure 2:
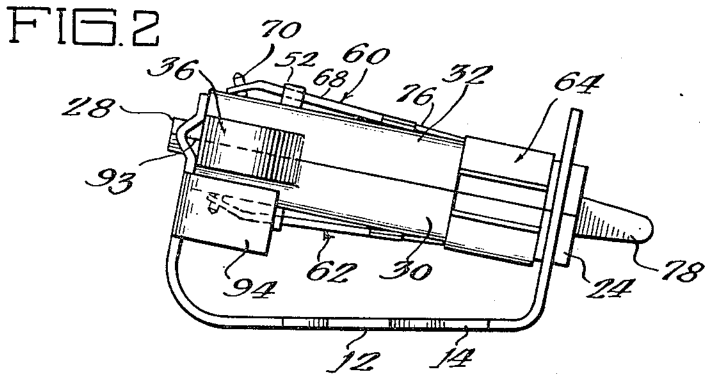
FIGURE 2 is a front elevational view of the phonograph pickup illustrated in FIGURE 1.
Figure 3:
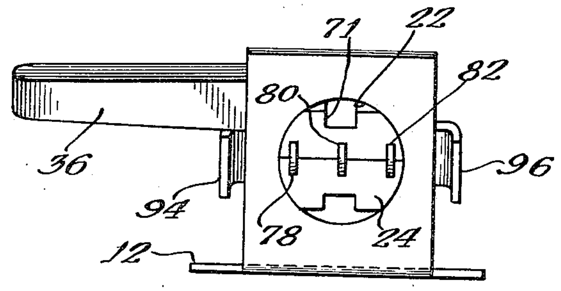
FIGURE 3 is a side elevational view of the phonograph pickup illustrated in FIGURES 1 and 2.

The phonograph pickup illustrated in the figures has a housing or casing 10 which is mounted on a bracket 12. The bracket 12 is adapted to be mounted on the tone arm of a conventional phonograph, which has not been illustrated. Openings 14 are provided in the bracket 12 for screws for the purpose of securing the pickup to the phonograph tone arm.

The bracket 12 has two parallel spaced leg portions 16 and 18 and an interconnecting strip portion 20. The leg portion 18 is provided with a relatively large circular opening 22, and the housing 10 has a circular protruding end 24 which is journaled within the opening 22. The leg portion 16 has a circular bore 26 therein confronting the opening 22 of the leg portion 18, and the end of the housing 10 opposite the protruding end 24 is provided with an outwardly extending circular stem 28 which is journaled within the bore 26. In this manner, the housing 10 is rotatably mounted relative to the bracket 12.

The housing 10 is constructed of two mating parts 30 and 32 which are cemented together. An elongated rectangular cavity 34 is disposed within the housing 10 between the parts 30 and 32. One of the parts is provided with an outwardly extending arm 36 which facilities rotation of the housing 10 relative to the bracket 12.

A resilient block 38 of electrically insulating material, such as rubber or vinyl plastic, is disposed in the cavity 34 adjacent to the protruding end 24. The block 38 is secured to the casing 10 and forms a resilient means for mounting one end of two elongated piezoelectric generating elements 40 and 42. The generating elements 40 and 42 have rectangular cross sections. One end of each of the generating elements is embedded in the block 38, and the transverse axes of the generating elements 40 and 42 are disposed normal to each other. Each of the generating elements 40 and 42 is preferably constructed of an artificial piezoelectric material, that is material which obtains its piezoelectric properties as a result of being polarized by an electrical potential, although it is to be understood that the present invention may be practiced with elements having piezoelectric properties in their natural state. Particularly suitable artificial piezoelectric materials are barium titanate or strontium titanate with ceramic binder, or lead zirconium titanate.

The generating elements 40 and 42 are provided with electrically conducting electrodes 44 and 46 on opposite surfaces, the electrodes being insulated from each other and extending the length of the generating elements 40 and 42.

Figure 4:
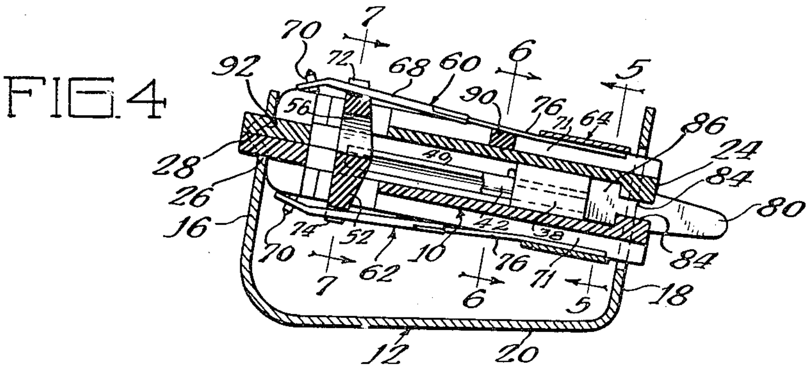
FIGURE 4 is a sectional view of the phonograph pickup taken along the line 4—4 of FIGURE 1.
Figure 7:
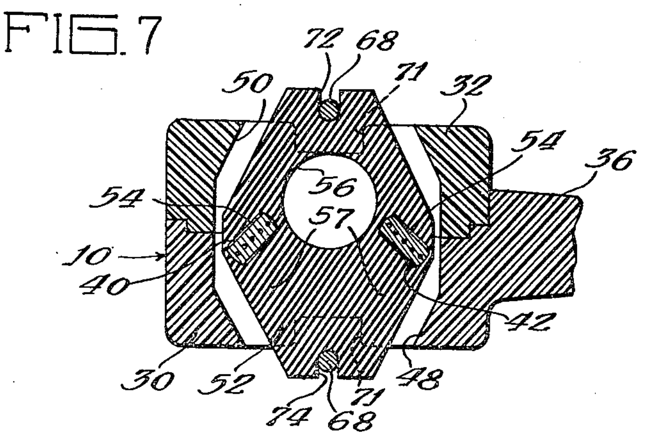
FIGURE 7 is a sectional view of the phonograph pickup taken along the line 7—7 of FIGURE 4.

The ends of the generating elements 40 and 42 opposite the resilient block 38 terminate between openings 48 and 50 in the parts 30 and 32 of the housing 10. The openings 48 and 50 are aligned with the axis of the cavity 34, and the generating elements 40 and 42 are disposed on a plane normal to the axis of the openings 48 and 50. A yoke 52 of electrically insulating compliant material, such as rubber or vinyl plastic, extends through the openings 48 and 50 and is secured to the end of both of the generating elements 40 and 42. As best illustrated in FIGURES 4 and 7, the ends of the generating elements 40 and 42 are embedded in conforming channels 54 extending through the yoke 52, and are secured therein, as by cement. An annular opening or passage 56 extends through the yoke 52 centrally between the generating elements 40 and 42, the passage 56 being disposed between the plane of the generating elements 40 and 42 and the opening 50 of the housing 10. The passage 56 forms two leg portions 57 in the yoke which extend normally from the transverse axis of the elements 40 and 42 and intersect remotely of the generating elements.

The housing 10 is provided with a pair of indentations 58 adjacent to the protruding end 24 of the housing and extending across the surfaces of the housing disposed normal to the plane of the generating elements 40 and 42. Two stylus holders 60 and 62 are mounted to the housing 10 by brackets 64 of spring metal. The brackets 64 have a flat portion 66 terminating in legs 67 at the ends thereof extending normally from the flat portion 66 and abutting the surface of the housing 10 within the indentations 58. The stylus holders 60 and 62 are thus seen to be clipped to the housing 10 and to be removable for replacing the stylus. Each of the stylus holders 60 and 62 has a rod 68 secured centrally to the flat portion 66 of the bracket 64 and terminating at its opposite end in a stylus 70. Each of the rods 68 has an obtuse angle adjacent to the stylus 70 to orient the stylus at the proper rake angle to the record surface. One of the styli has a diameter selected for records with wider grooves. Both parts 30 and 32 of the housing 10 are provided with longitudinal slots 71 confronting the rods 68 to avoid interference with motion of the rods.

The yoke 52 is provided with two grooves 72 and 74 which are located on a plane normal to the plane of the generating elements 40 and 42 and midway between the generating elements 40 and 42. The rod 68 of the stylus holder 60 is wedged within the groove 72, and the rod 68 of the stylus holder 62 is wedged within the groove 74. The rods 68 have restricted portions 76 adjacent to the brackets 64, and hence act as if pivotally connected to the brackets. As a result, movement of either one of the styli 70 is transmitted to the yoke 52, and hence to the generating elements 40 and 42. Since the forces impressed on either one of the styli responsive to one channel of the record are at 45 degrees relative to the axis of that stylus, the forces are normal to the transverse axis of one generating element 40 or 42 and parallel to the transverse axis of the other generating element. Because the generating elements are more compliant to forces normal to the transverse axis, one of the elements will be deflected or bent to a substantially greater degree than the other, thus producing a substantially greater electrical response than the other element. Further, the element driven normal to its transverse axis is driven by compressing the compliant yoke 52, while the other element is driven by shearing the compliant yoke. Both of these effects combine to result in a substantial electrical output from one element and a small electrical output from the other element, or in other words, electrical isolation between channels.

Three electrical contacts 78, 80 and 82 extend through the protruding end 24 of the housing into the cavity 34. Each part 30 and 32 of the casing 10 is provided with a slot 84 for accommodating each of the contacts, and the slots in the confronting parts 30 and 32 of the housing 10 are aligned. The contacts 78, 80 and 82 have expanded end portions 86 within the cavity 34 to anchor the contacts to the housing.

Figure 5:
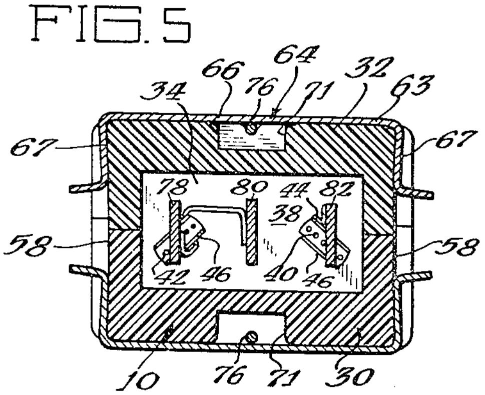
FIGURE 5 is a sectional view of the phonograph pickup taken along the line 5—5 illustrated in FIGURE 4.
Figure 6:
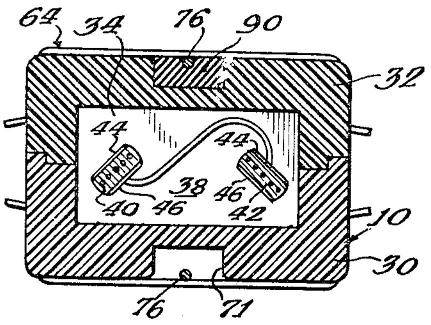
FIGURE 6 is a sectional view of the phonograph pickup taken along the line 6—6 of FIGURE 4.

FIGURES 5 and 6 illustrate the electrical connections between the contacts 78, 80 and 82 and the electrodes 44 and 46 of the generating elements 40 and 42. The electrode 46 of generating element 40 is connected to the electrode 44 of generating element 42, and these electrodes are connected to the center contact 80 which is the contact to be connected to a common ground conductor of two electroacoustical stereophonic channels. The electrode 44 of the generating element 40 is connected to the contact 82, and the electrode 46 of the generating element 42 is connected to the contact 78.

It is to be noted that the generating elements 40 and 42 are electrically polarized to generate potentials of opposite sign on the interconnected electrodes of the elements in response to a vertical deflection, thus a vertical deflection of the elements, that is a bending of both elements upwardly or downwardly generates a positive charge on one of the contacts 78 or 82 and a negative charge on the other relative to the common contact 80. A resistor 88, as illustrated in FIGURE 1, may thus be connected between the contacts 78 and 82 to reduce rumble of the turntable, as disclosed in the application of Howard M. Durbin entitled "Record Reproducer," Ser. No. 736,820, now abandoned. The terminals 78 and 82 are connected to channels No. 1 and No. 2 of a sound reproducing system, and terminal 80 to the common connection between the channels.

There is a tendency under some circumstances to introduce distortion due to excessive displacement of the stylus support rod 68. For this reason, a compliant snubber 90 is secured to the housing 10 abutting the rod 68 of the stylus holder 60, thereby eliminating this cause of distortion.

The pickup here disclosed is designed to respond to both lateral undulations of conventional records and stereophonic records which employ channels pressed at 45 degree angles relative to the record surface. The stylus 70 of the stylus holder 62 is employed for the narrower or microgroove records including stereophonic records, and the stylus of the holder 60 is used for wider groove records. However, since the output of records with wider grooves exceeds that of a microgroove record, it is desirable to reduce the response of the pickup to the wider groove records. The passage or opening 56 in the compliant yoke 52 is disposed between the rod 68 and the generating elements 40 and 42 for the purposes of reducing coupling between the stylus holder 60 and the generating elements. The passage 56 also extends between the elements 40 and 42 to reduce the coupling therebetween.

In one particular construction of a phonograph pickup according to the present invention, the generating elements 40 and 42 are disposed at a distance between axes of 0.130 inch, and the passage 56 has a diameter of 0.078 inch. The yoke 52 is constructed of rubber and has a thickness tapering from 0.040 at the slots 72 and 74 to 0.060 in the plane of the generating elements. The yoke has a width in the plane of the generating elements of 0.185 and a length normal thereto of 0.24 inch. The generating elements are constructed of lead zirconium titanate and have a length of seven-sixteenths inch, width of 0.062 inch and thickness of 0.026 inch.

The bracket 12 is provided with a groove 92 in the leg portion 16 thereof in the plane of the bore 26 and parallel to the strip portion 20, and the end of the housing opposite the protruding end 24 has an outwardly extending ridge 93 aligned with the stem 28 and parallel to the plane of the generating elements 40 and 42. The ridge 93 is adapted to mate with the groove 92. The groove 92 and ridge 93 thus form a detent to prevent rotation of the housing relative to the bracket 12 when one of the styli 70 is disposed normal to a turntable surface. In addition to the detent mechanism, the turnover mechanism is provided with stops. The stops are formed by outwardly extending tabs 94 and 96 from the leg portion 16 of the bracket 12 which are bent toward the leg portion 18. The arm 36 abuts one of the tabs 94 or 96 when the ridge 93 of the housing is accommodated in the groove 92.

It is to be noted that the inventor has provided a combination turnover mechanism and phonograph pickup cartridge. The entire cartridge may be removed from a phonograph by applying pressure between the leg portions 16 and 18 of the bracket 12 to open the bracket sufficient to permit the stem 28 to become disengaged from the bore 26. It is also to be noted that the leg portion 16 is substantially longer than the leg portion 18 and at an acute angle to the strip portion 20 of the bracket 12. This construction permits the stylus 70 to be at the proper rake angle to the record without complicating the turnover device.

From the foregoing disclosure, those skilled in the art will readily device modifications and embodiments of the present invention within the scope of this invention. It is therefore intended that the scope of the invention be not limited by the foregoing disclosure, but rather only by the appended claims.

The invention claimed is:

1. A stereophonic phonograph pickup having a block of resilient material, a pair of piezoelectric generating elements having bodies with central axes of elongation and electrodes disposed on opposite surfaces thereof mounted at one end on the block of resilient material, said generating elements being disposed with their axes of elongation in a common plane and generally parallel to each other in spaced relationship, the axes between the electrodes of the generating elements being normal to each other, a yoke of resilient material mounted to the end of each of the generating elements opposite the block, first and second styli mounted to the yoke on opposite sides of the plane of the generating elements, each stylus being in a plane normal to the plane of the generating elements and equidistant from the generating elements, one of the styli having a larger diameter than the other and the yoke of compliant material being provided with an opening between the plane of the generating elements and the larger stylus.

2. A turnover stereophonic phonograph pickup comprising a housing having an elongated cavity therein and openings into one end of the cavity in opposite walls, a block of resilient material mounted to the housing within the cavity and spaced from the openings, a pair of piezoelectric elements having bodies with central axes of elongation and electrodes on opposite surfaces thereof mounted at one end to the block of resilient material, said elements being disposed with their central axes of elongation in a common plane and parallel to each other in spaced relationship with the axes between the electrodes thereof being normal to each other and intersecting in the plane normal to the plane of the elements and equidistant from the elements, a yoke constructed of resilient material secured to the end of each element opposite the block and extending through each of the openings to the exterior of the housing, said yoke having grooves exterior to the housing confronting each opening in the plane equidistant from the elements, a pair of stylus holders having a spring clip at one end wedged about the housing and a rod extending from the clip, each rod being wedged within one of the grooves of the yoke, and a stylus secured to the end of each stylus holder opposite the clip.

3. A turnover stereophonic pickup comprising the elements of claim 2 wherein one of the styli has a larger diameter than the other and the yoke is provided with an opening between the generating elements and in the plane of the styli between the plane of the elements and the larger stylus.

4. A stereophonic phonograph pickup comprising the elements of claim 2 wherein each piezoelectric element is polarized in opposite directions relative to a plane normal to the axis between the electrodes of the element in combination with a first, second and third electrical contact extending through the housing into the cavity therein, the first contact being electrically connected to the electrode of one element confronting the one stylus and the electrode of the other element remote from said one stylus, and the other two contacts being electrically connected to the other electrodes of the generating elements, respectively.

5. A stereophonic phonograph pickup comprising the elements of claim 2 wherein the housing is provided with a circular protruding end and an outwardly extending stem at the other end axially aligned with the protruding end, and a bracket adapted to be secured to a tone arm has two spaced leg portions, the one leg portion having a bore accommodating the stem and the other leg portion having a circular opening accommodating the protruding end of the housing.

6. In a binaural pickup for use with a sound record member having a groove provided with angularly related side faces, each of said faces having separate undulations, each corresponding to a single sound channel including, support means, stylus means, and a two channel discriminating energy-transforming system, said energy-transforming system including an integrally formed coupling member and two electrostrictive transducer means, said integral coupling member being composed of compliant material and including at least two longitudinally extending elements flexurally joined at their one ends and having remote portions extending divergently away from said juncture, the respective divergent portions of said coupling means being disposed in directions normal to the respective side faces of said groove, said longitudinally extending elements including their remote portions being disposed in a common plane, each said transducer means having a mounting portion and a driven portion remote from said mounting portion and being responsive to bodily flexure in said common plane resulting from displacement of said driven portion relative to said mounting portion by forces generated by the elements of said coupling member to provide electrical signals, means to mount the stylus means on the support means to move relatively freely in a plane substantially normal to said record groove, means to support the mounting portion of said transducers on the support means, means to mount the integral coupling member on said transducers to operatively engage the juncture of said divergent elements with the stylus means and to operatively engage the respective remote portions of said elements with the respective driven portions of said transducer means.

References Cited

UNITED STATES PATENTS

| | | | |
|---|---|---|---|
| 2,093,540 | 9/1937 | Blumlein | 179—100.41 |
| 2,114,471 | 4/1938 | Keller et al. | 179—100.41 |
| 2,328,952 | 9/1943 | Burt | 179—100.41 |
| 2,991,331 | 7/1961 | Ross | 179—100.41 |

OTHER REFERENCES

German printed application No. T11092, Batsch, December 1956.

BERNARD KONICK, Primary Examiner

RAYMOND F. CARDILLO, Jr., Assistant Examiner

U.S. Cl. X.R.

274—37